United States Patent
Cooke et al.

(10) Patent No.: US 10,196,064 B2
(45) Date of Patent: Feb. 5, 2019

(54) CONTROLLER AND METHOD FOR CONTROLLING A MOTOR VEHICLE

(71) Applicant: JAGUAR LAND ROVER LIMITED, Whitley, Coventry, Warwickshire (GB)

(72) Inventors: Charlotte Cooke, Haywards Heath (GB); Paul Beever, Rugby (GB); Jon Parr, Leamington Spa (GB); Andrew Fairgrieve, Rugby (GB); Nick Brockley, Lichfield (GB); James Kelly, Solihull (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 2 days.

(21) Appl. No.: 15/125,867

(22) PCT Filed: Mar. 12, 2015

(86) PCT No.: PCT/EP2015/055206
§ 371 (c)(1),
(2) Date: Sep. 13, 2016

(87) PCT Pub. No.: WO2015/136048
PCT Pub. Date: Sep. 17, 2015

(65) Prior Publication Data
US 2017/0001646 A1 Jan. 5, 2017

(30) Foreign Application Priority Data
Mar. 13, 2014 (GB) .................................. 1404444.0

(51) Int. Cl.
*B60W 50/14* (2012.01)
*B60W 30/18* (2012.01)
(Continued)

(52) U.S. Cl.
CPC ...... *B60W 30/18172* (2013.01); *B60W 10/04* (2013.01); *B60W 10/10* (2013.01);
(Continued)

(58) Field of Classification Search
CPC . B60W 30/18172; B60W 50/14; B60W 10/04
(Continued)

(56) References Cited

U.S. PATENT DOCUMENTS 6,898,505 B2  5/2005  Kadota et al.
6,952,635 B2  10/2005 Yasui et al.
(Continued)

FOREIGN PATENT DOCUMENTS

CN      1454799 A    11/2003
CN    101372230 A     2/2009
(Continued)

OTHER PUBLICATIONS

Junhui et al., Road Surface Condition Detection based on Road Surface Temperature and Solar Radiation, 2010, IEEE, 2010 International Conference on Computer, Mechatronics, Control, and Electronic Engineering (CMCE) (Year: 2010).*
(Continued)

*Primary Examiner* — Nadeem Odeh
(74) *Attorney, Agent, or Firm* — Reising Ethington, P.C.

(57) ABSTRACT

A motor vehicle controller that carries out a method which includes: receiving a signal indicative of a surface friction parameter, surface_friction, the surface friction parameter corresponding to a coefficient of friction between a road wheel and a driving surface; receiving a signal indicative of a position of an accelerator control with respect to an allowable range of positions, accel_ctrl_pos; determining a critical powertrain torque limit value PT_TQ_CRIT in dependence at least in part on the value of surface_friction; and providing a traction warning indication to a driver in
(Continued)

dependence on the value of accel_ctrl_pos and PT_TQ_CRIT.

28 Claims, 9 Drawing Sheets

(51) Int. Cl.
| | |
|---|---|
| *B60W 50/08* | (2012.01) |
| *B60W 10/04* | (2006.01) |
| *B60W 10/10* | (2012.01) |
| *B60W 10/18* | (2012.01) |
| *B60W 10/20* | (2006.01) |
| *B60W 10/22* | (2006.01) |
| *B60W 50/00* | (2006.01) |

(52) U.S. Cl.
CPC .......... *B60W 10/18* (2013.01); *B60W 10/20* (2013.01); *B60W 10/22* (2013.01); *B60W 50/082* (2013.01); *B60W 50/14* (2013.01); B60W 2050/0095 (2013.01); B60W 2050/146 (2013.01); B60W 2520/10 (2013.01); B60W 2520/26 (2013.01); B60W 2530/16 (2013.01); B60W 2540/10 (2013.01); B60W 2550/148 (2013.01); B60W 2710/10 (2013.01); B60W 2710/18 (2013.01); B60W 2710/20 (2013.01); B60W 2710/22 (2013.01); B60W 2720/14 (2013.01)

(58) Field of Classification Search
USPC ...................................................... 701/90, 37
See application file for complete search history.

(56) References Cited

U.S. PATENT DOCUMENTS

| | | | |
|---|---|---|---|
| 7,853,389 B2 | 12/2010 | Luehrsen et al. | |
| 8,019,520 B2 | 9/2011 | Osaki et al. | |
| 8,538,652 B2 | 9/2013 | Charpin et al. | |
| 2003/0200016 A1* | 10/2003 | Spillane | B60G 17/0195 701/36 |
| 2009/0055068 A1* | 2/2009 | Osaki | B60K 28/16 701/87 |
| 2009/0112437 A1* | 4/2009 | Luehrsen | B60T 8/175 701/84 |
| 2010/0088000 A1* | 4/2010 | Charpin | B60K 28/16 701/70 |
| 2010/0161194 A1* | 6/2010 | Turski | B60T 8/175 701/87 |
| 2011/0060487 A1* | 3/2011 | Jess | B60K 28/165 701/22 |
| 2013/0184930 A1* | 7/2013 | Fuehrer | G06F 17/00 701/32.3 |
| 2016/0259362 A1* | 9/2016 | Suzaki | B60K 26/04 |

FOREIGN PATENT DOCUMENTS

| | | |
|---|---|---|
| CN | N102248943 A | 11/2011 |
| DE | 4314826 A1 | 11/1994 |
| EP | 1407950 A1 | 10/2003 |
| EP | 1359041 A2 | 11/2003 |
| FR | 2913635 A1 | 9/2008 |
| GB | 2454336 A | 5/2009 |
| JP | H04145599 A | 5/1992 |
| JP | H0592731 A | 4/1993 |
| JP | H0699761 A | 4/1994 |
| JP | H07186928 A | 7/1995 |
| JP | 2001250176 A | 9/2001 |
| JP | 2005008089 A | 1/2005 |
| JP | 2005112034 A | 4/2005 |
| KR | 20010090105 A | 10/2001 |
| WO | WO2013186208 A2 | 12/2013 |

OTHER PUBLICATIONS

Combined Search and Examination Report for application No. GB1404444.0, dated Oct. 6, 2014, 8 pages.
International Search Report for International application No. PCT/EP2015/055206, dated Jun. 9, 2015, 7 pages.
Written Opinion for International application No. PCT/EP2015/055206, dated Jun. 9, 2015, 7 pages.
Japanese Office Action in Japanese with English summary, dated Oct. 3, 2017, 7 pages.
Chinese Office Action for application No. 201580019887.1, dated Mar. 27, 2018, 11 pages.

* cited by examiner

CONTROLLER AND METHOD FOR CONTROLLING A MOTOR VEHICLE

TECHNICAL FIELD

The present invention relates to controllers for motor vehicles. In particular but not exclusively the invention relates to a controller for providing feedback to a driver to assist a driver of a motor vehicle.

BACKGROUND

It is known to provide a controller for controlling an amount of power developed by a powertrain of a vehicle. Known controllers receive a signal from an accelerator pedal of the vehicle indicating the position of the pedal with respect to an allowable range of travel of the pedal. The controller controls the powertrain to develop an amount of torque that is calculated from a map of powertrain torque as a function of accelerator pedal position and other data such as potentially available torque and engine speed.

It is also known to provide a vehicle having a control system that is operable in one or more of a plurality of driving modes which may also be referred to as control modes or operating modes. In each driving mode, the control system is configured to cause each one of a plurality of vehicle subsystems to be operated in a subsystem configuration mode appropriate to the driving condition.

In one known system the subsystems include an engine management system, a transmission system, a steering system, a brakes system and a suspension system. The engine management system is configured to control the amount of torque developed by an engine of the vehicle in dependence on the position of an accelerator pedal of the vehicle. In order to do this the engine management systems refers to a map of required engine torque as a function of accelerator pedal position that is stored in a memory of the controller. The engine management system stores a plurality of maps and associates one map with each configuration mode of the engine management system. The map associated with each configuration mode is adapted to provide improved vehicle performance.

The control modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode) which is a suitable compromise mode, or general mode, for all terrain conditions and especially vehicle travel on motorways and regular roadways. A number of control modes, and examples of their implementation, are disclosed in US2003/0200016, the content of which is hereby incorporated by reference.

The different terrain types are grouped according to characteristics of the terrain (such as surface friction and roughness). For example, it is appropriate to group grass, gravel and snow together as terrains that provide a low friction, smooth surface and it is appropriate to group rock and boulder terrains together as high friction, very high roughness terrains. Low friction modes may also include an ice mode in which the subsystems are controlled in a manner suitable for driving on ice, and one of which may be a mud mode in which the subsystems are controlled in a manner suitable for driving on mud.

In the GGS control mode, the engine management system employs an accelerator pedal position/engine torque map that provides relatively low levels of engine torque during an initial range of positions of the accelerator pedal, the amount of torque increasing more rapidly as a function of pedal position over a middle range of positions between an undepressed pedal position and fully depressed pedal position. The relatively low levels of engine torque during the initial range of positions is advantageous in reducing excessive wheel spin when a driver attempts to accelerate a vehicle from rest.

In contrast, in the RB mode, the engine management system employs an accelerator pedal position/engine torque map that provides a relatively abrupt increase in engine torque during an initial range of positions of the accelerator pedal, in order to facilitate climbing of rocks and other obstacles presenting a relatively abrupt, steep increase in gradient of a path of travel of a vehicle.

As noted above, in the sand mode the subsystems are controlled in a manner suitable for driving on sand. A traction control system may be arranged, when the control system is in the sand mode, to allow only relatively low levels of wheel spin when the vehicle is traveling at low speeds so as to avoid the vehicle wheels becoming submerged in sand, but to allow relatively high levels of wheel spin when the vehicle is traveling at higher speeds. In the sand mode, the engine management system is arranged to provide relatively low levels of drive torque for a given accelerator pedal position at low vehicle speeds and to provide relatively high levels of drive torque for a given throttle pedal position at higher vehicle speeds.

It is an aim of the present invention to provide improved traction characteristics for a motor vehicle when driving in conditions where surface coefficient of friction between one or more wheels of a vehicle and a driving surface is relatively low.

SUMMARY OF THE INVENTION

Embodiments of the invention may be understood with reference to the appended claims.

Aspects of the present invention provide an apparatus, a vehicle and a method.

In one aspect of the invention for which protection is sought there is provided a motor vehicle controller comprising:

means for receiving a signal indicative of a surface friction parameter, said surface friction parameter corresponding to a coefficient of friction between a road wheel and a driving surface;

means for receiving a signal indicative of a position of an accelerator control with respect to an allowable range of positions;

means for determining a critical powertrain torque limit value in dependence at least in part on the value of the a signal indicative of a surface friction parameter; and means for providing a traction warning indication to a driver in dependence on the value of the signal indicative of a position of an accelerator control and the critical powertrain torque limit value.

Some embodiments of the present invention have the advantage that the controller can anticipate a driver demand for an amount of powertrain torque exceeding a critical value, and provide a traction warning indication to the driver. The critical value may correspond for example to a value of powertrain torque at which a force on a tire exceeds a predetermined amount, the predetermined amount being determined in dependence at least in part on signal indicative of a surface friction parameter.

The predetermined amount may also depend on a lateral force on a tire. The lateral force may be determined at least in part in dependence on an amount of lateral acceleration of a vehicle.

In an embodiment the means for receiving a signal indicative of a surface friction parameter may comprise an electronic processor having an electrical input for receiving said signal indicative of a surface friction parameter. The means for receiving a signal indicative of a position of an accelerator control with respect to an allowable range of positions may comprise an electronic processor having an electrical input for receiving said signal indicative of a position of an accelerator control with respect to an allowable range of positions.

Preferably the controller comprises an electronic memory device electrically coupled to the electronic processor and having instructions stored therein, and the means for determining a critical powertrain torque limit value in dependence at least in part on the value of the surface friction parameter, comprises the processor being configured to access the memory device and execute the instructions stored therein such that it is operable to determine said critical powertrain torque limit based on the value of the surface friction parameter.

Preferably the means for providing a traction warning indication to a driver in dependence on the value of the signal indicative of a position of an accelerator control and critical powertrain torque limit value comprises the processor being configured to access the memory device and execute the instructions stored therein such that it is operable to command the issuance of said warning indication to the driver.

Some embodiments of the present invention have the advantage that a driver is able to limit the amount by which the accelerator pedal control is moved in order to prevent the amount of torque developed by a powertrain from exceeding the critical powertrain torque limit value.

Some embodiments of the invention may improve vehicle composure by making it less easy for a driver inadvertently to cause excessive slip of one or more driving wheels whilst negotiating slippery terrain commonly found in off-road driving conditions. Embodiments of the present invention have the advantage that driver workload may be reduced, enabling a driver to focus their attention on steering a vehicle.

Optionally, the means for receiving a signal indicative of a surface friction parameter, is configured to receive a value of surface friction parameter corresponding to an expected coefficient of friction. The expected value may be a substantially fixed value, for example a value corresponding to a dry asphalt surface, optionally a value of substantially unity. In some embodiments the value may be set in dependence on a parameter indicative of a mode of operation of the vehicle, for example a driving mode of a vehicle in a vehicle having a plurality of driving modes. The driving modes may be adapted to different terrain conditions such as grass, gravel, snow, mud, rocks or boulders, sand and/or any other terrain condition. Other arrangements may also be useful.

Alternatively the means for receiving a signal indicative of a surface friction parameter, is configured to receive a signal corresponding to a measured or estimated value of surface friction parameter determined in response to a measurement of one or more other parameters such as wheel slip, surface moisture and/or one or more other parameters.

Optionally the means for determining the critical powertrain torque limit value is configured to determine the critical powertrain torque limit value in dependence on an amount of torque required to cause slip of one or more driving wheels to exceed a predetermined amount.

The controller may be configured wherein the predetermined amount of slip is determined by the data processing apparatus in dependence at least in part on the surface friction parameter.

The controller may be configured to receive a signal indicative of instant vehicle speed, the controller being configured to determine the predetermined amount of slip in further dependence at least in part on the signal indicative of instant vehicle speed.

The controller may be configured to receive at least one further parameter indicative of the nature of terrain over which a vehicle is driving, the controller being configured to determine the predetermined amount of slip in further dependence on the at least one further parameter indicative of the nature of terrain over which a vehicle is driving.

Optionally the at least one further parameter may include a parameter indicative of an amount of drag on a vehicle.

The amount of drag on a vehicle may be useful in identifying whether a vehicle is travelling over a readily deformable surface such as sand, which may present a particular challenge to a driver attempting to traverse such terrain.

Optionally, the at least one further parameter includes a parameter indicative of a driving mode in which a vehicle is operating.

Optionally, the parameter indicative of a driving mode in which a vehicle is operating corresponds to a state of a manual driving mode selector input device or a signal indicative of a driving mode selected automatically by automatic driving mode selection means.

In one aspect of the invention for which protection is sought there is provided a motor vehicle control system comprising a controller according to another aspect.

Optionally, each driving mode corresponds to a control mode of at least one subsystem of a vehicle, the control system having a subsystem controller for initiating control of a vehicle subsystem in a selected one of the plurality of subsystem control modes Optionally, each driving mode may correspond to one or more different driving conditions for a vehicle.

Optionally, the system comprises evaluation means for evaluating one or more driving condition indicators to determine the extent to which each of the subsystem control modes is appropriate.

Optionally, the system is operable in an automatic operating mode selection condition in which the system is configured automatically to control the subsystem controller to initiate control of the or each subsystem in the subsystem control mode which is most appropriate.

Optionally, each driving mode corresponds to one or more control modes selected from the following:
  control modes of at least one vehicle subsystem selected from amongst an engine management system, a transmission system, a steering system, a brakes system and a suspension system;
  control modes of a suspension system, wherein the plurality of subsystem configuration modes comprise a plurality of ride heights;

control modes of a fluid suspension system in which fluid interconnection can be made between suspensions for wheels on opposite sides of the vehicle, and wherein said plurality of subsystem configuration modes provide different levels of said interconnection;

control modes of a steering system which can provide steering assistance, and wherein said plurality of subsystem configuration modes provide different levels of said steering assistance;

control modes of a brakes system which can provide braking assistance, and said plurality of subsystem configuration modes provide different levels of said braking assistance;

control modes of a brake control system which can provide an anti-lock function to control wheel slip, and said plurality of subsystem configuration modes allow different levels of said wheel slip;

control modes of a powertrain system which includes a powertrain control means and an accelerator or throttle pedal, the subsystem configuration modes providing different levels of responsiveness of the powertrain control means to movement of the accelerator or throttle pedal;

control modes of a traction control system which is arranged to control wheel spin, and said plurality of subsystem configuration modes allow different levels of said wheel spin;

control modes of a yaw control system which is arranged to control vehicle yaw, and said plurality of subsystem configuration modes allow different levels of divergence of said vehicle yaw from an expected yaw;

control modes of a range change transmission and said subsystem configuration modes include a high range mode and a low range mode of said transmission; and control modes of a transmission system operable in a plurality of transmission ratios and including a transmission control means arranged to monitor at least one parameter of the vehicle and to select the transmission ratios in response, and wherein the subsystem configuration modes include a plurality of transmission configuration modes in which the transmission ratios are selected differently in response to said at least one parameter.

In one aspect of the invention for which protection is sought there is provided a motor vehicle comprising a controller according to one aspect or a control system according to another aspect.

In one aspect of the invention for which protection is sought there is provided a vehicle comprising a chassis, a body attached to said chassis, a plurality of wheels, a powertrain to drive said wheels, a braking system to brake said wheels, and a controller according to one aspect or a control system according to another aspect.

In one aspect of the invention for which protection is sought there is provided a method implemented by means of a controller comprising:

receiving a signal indicative of a surface friction parameter (surface_friction) said surface friction parameter corresponding to a coefficient of friction between a road wheel and a driving surface;

receiving a signal indicative of a position of an accelerator control with respect to an allowable range of positions (accel_ctrl_pos);

determining a critical powertrain torque limit value (PT_TQ_CRIT) in dependence at least in part on the value of the signal indicative of a surface friction parameter (surface_friction); and providing a traction warning indication to a driver in dependence on the value of the signal indicative of a position of an accelerator control (accel_ctrl_pos) and the critical powertrain torque limit value (PT_TQ_CRIT).

The method may comprise determining the critical powertrain torque limit value PT_TQ_CRIT in dependence on an amount of torque required to cause slip of one or more driving wheels to exceed a predetermined amount.

The method may comprise determining the predetermined amount of slip in dependence at least in part on the surface friction parameter.

The method may comprise receiving a signal indicative of instant vehicle speed (ref_speed) and determining the predetermined amount of slip in further dependence at least in part on the signal indicative of instant vehicle speed.

Optionally, the method may comprise receiving at least one further parameter indicative of the nature of terrain over which a vehicle is driving, the method comprising determining the predetermined amount of slip in further dependence on the at least one further parameter indicative of the nature of terrain over which a vehicle is driving.

Optionally, receiving at least one further parameter indicative of the nature of terrain comprises receiving a parameter indicative of an amount of drag on a vehicle.

Optionally, receiving at least one further parameter indicative of the nature of terrain comprises receiving a parameter indicative of a driving mode in which a vehicle is operating.

Optionally, receiving the parameter indicative of driving mode comprises receiving a signal indicative of a state of a manual driving mode selector input device or a signal indicative of a driving mode selected automatically by automatic driving mode selection means.

Optionally, the method comprises initiating control of a vehicle subsystem in a selected one of a plurality of subsystem control modes determined in dependence on the parameter indicative of driving mode.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

Figure 1:
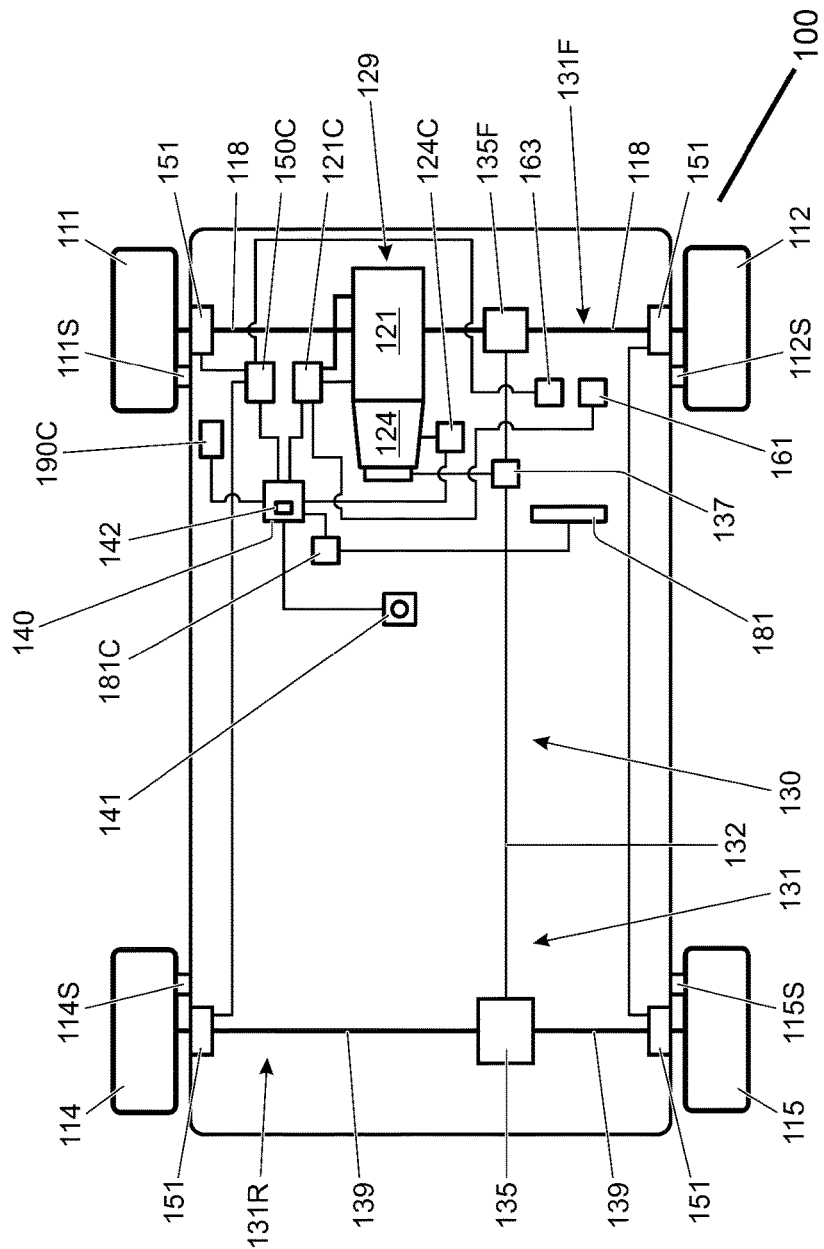
FIG. 1 is a schematic illustration of a motor vehicle according to an embodiment of the present invention.

FIG. 1 is a schematic illustration of a motor vehicle 100 according to an embodiment of the present invention. The vehicle 100 is intended to be suitable for off-road use. That is, for use on terrains other than regular tarmac road, as well as on-road. The vehicle 100 has a powertrain 129 that includes an engine 121 that is connected to a driveline 130 having a transmission 124. In the embodiment shown the transmission 124 is an automatic transmission 124. Embodiments of the present invention are also suitable for use in vehicles with a manual transmission, continuously variable transmission or any other suitable transmission.

The driveline 130 is arranged to drive a pair of front vehicle wheels 111,112 by means of a front differential 135F and a pair of front drive shafts 118. The front differential 135F and drive shafts 118 form part of a front axle portion 131F of the vehicle 100. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The rear differential 135 and drive shafts 139 form part of a rear axle portion 131R of the vehicle 100.

In the embodiment of FIG. 1 the transmission 124 is releasably connectable to the auxiliary driveline portion 131 by means of a power transfer unit (PTU) 137, allowing selectable two wheel drive or four wheel drive operation. Other arrangements are also useful.

The PTU 137 is operable in a 'high ratio' or a low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

It is to be understood that embodiments of the present invention are not limited to vehicles with drivelines having a prop shaft and/or PTU. In some embodiments one or more wheels may be coupled substantially directly to an electric propulsion motor, for example to a wheel hub motor, and not via a transmission, prop shaft, differential or other driveline component. Other arrangements may also be useful.

The vehicle 100 has an accelerator pedal 161, brake pedal 163 and a steering wheel 181.

The vehicle 100 has a central controller, referred to as a vehicle control unit (VCU) 140. The VCU 140 receives and outputs a plurality of signals to and from various sensors and subsystems provided on the vehicle 100.

The VCU 140 is in communication with a plurality of vehicle subsystem controllers including an engine controller 121C, a transmission controller 124C, an electronic power assisted steering controller (ePAS controller) 181C, an antilock braking system (ABS) controller 150C arranged to control brakes 151 associated with each wheel 111, 112, 114, 115 and a suspension system controller 190C. In some embodiments, instead of an ePAS controller 181C, a hydraulically operated power steering unit may be provided.

Although five subsystems are illustrated as being under the control of the VCU 140, in some embodiments a greater number of vehicle subsystems may be included on the vehicle and may be under the control of the VCU 140.

The VCU 140 includes a subsystem control module 142 which provides control signals to each of the vehicle subsystems to initiate control of the subsystems in a manner appropriate to the driving condition, such as the terrain, in which the vehicle is travelling (referred to as the terrain condition). The subsystems also communicate with the subsystems control module 142 to feedback information on subsystem status.

The VCU 140 is operable to control the subsystems to operate in one of a plurality of control modes. In each control mode, each subsystem is caused to assume one of a plurality of subsystem configuration modes. The control modes include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RB mode) which is suitable for when the vehicle is travelling in rock or boulder terrain, a sand mode which is suitable for when the vehicle is travelling in sand terrain (or deep soft snow) and a special programs OFF mode (SP OFF mode) which is a suitable compromise mode, or general mode, for all terrain conditions and especially vehicle travel on motorways and regular roadways. Other control modes are also envisaged.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

A user may select a required control mode by means of control mode selector 141 shown in FIG. 1. The selector 141 is in the form of a dial that may be rotated to select the appropriate control mode. Systems implementing this functionality are known, and are described for example in US2003/0200016, the content of which is hereby incorporated by reference.

In addition to allowing manual section of a required control mode, the VCU 140 is also configured to determine automatically an appropriate control mode when the VCU 140 is placed in an automatic mode selection mode or condition, by means of the selector 141.

Accelerator Pedal Depressed Too Far

Figure 2:
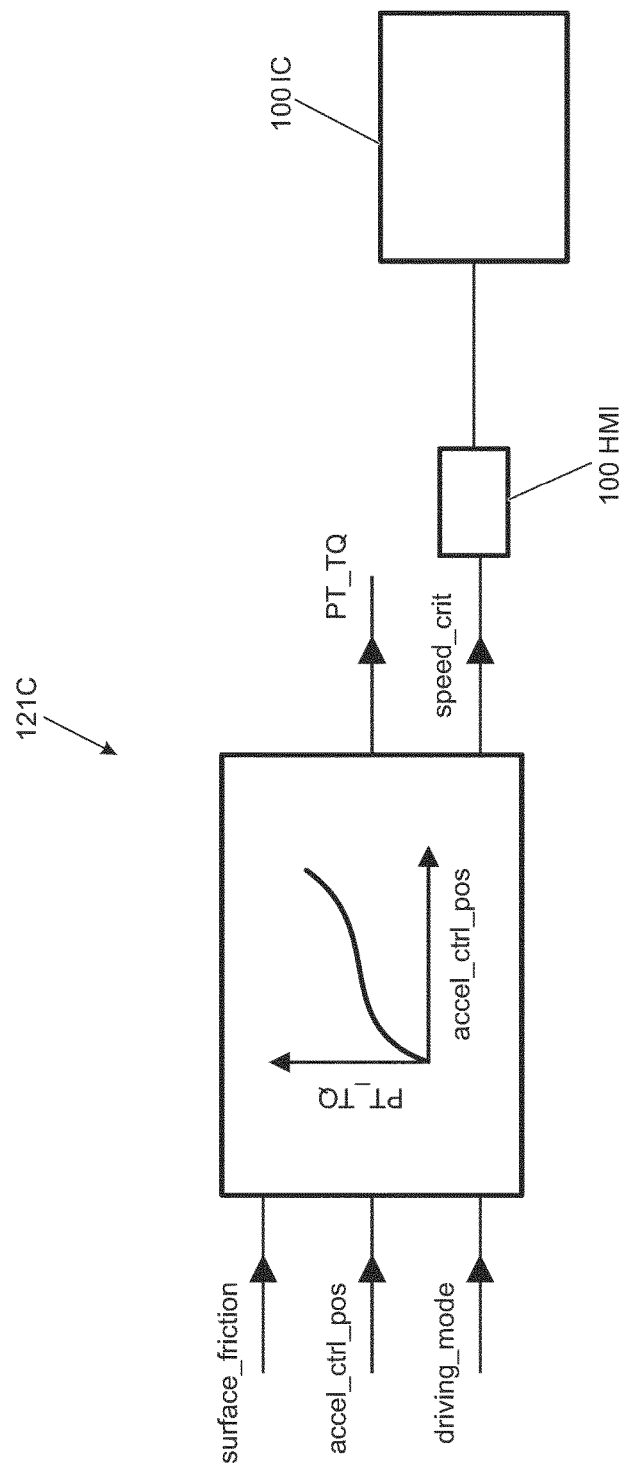
FIG. 2 is a schematic illustration of a portion of a motor vehicle controller according to an embodiment of the present invention.

FIG. 2 shows the engine controller 121C in more detail. The engine controller 121C is arranged to receive a signal accel_ctrl_pos from the accelerator pedal 161 indicative of an amount by which accelerator pedal 161 has been depressed. The signal indicates the position of the pedal 161 with respect to an allowable range of travel. In the present embodiment the signal has a value in the range from 0 to 1, where 0 corresponds to a released position of the pedal 161 and 1 corresponds to a fully depressed position of the pedal 161.

The engine controller 121C also receives a signal driving_mode indicative of a driving mode in which the vehicle 100 is currently operating. The engine controller 121C selects one of a plurality of predetermined relationships between the signal accel_ctrl_pos and the amount of torque that the engine 121 is required to develop, PT_TQ, in dependence on the signal driving_mode. That is, each driving mode has a corresponding predetermined relationship between the signal accel_ctrl_pos and the amount of torque that the engine 121 is required to develop, PT_TQ. Having determined the corresponding predetermined relationship, the controller 121C determines the value of PT_TQ corresponding to the instant value of accel_ctrl_pos.

The engine controller 121C also receives a value of a signal surface_friction corresponding to the value of surface coefficient of friction between wheels of the vehicle 100 and the surface over which the vehicle 100 is driving. In the present embodiment, the value of surface_friction is calculated by ABS controller 150C based on a comparison between wheel speed signals received by the ABS controller 150C and a vehicle reference speed value v_ref corresponding to an actual speed of the vehicle 100 over ground. The wheel speed signals are generated by wheel speed sensors 111S, 112S, 114S, 115S associated with each wheel of the vehicle 100. The ABS controller 150C is configured to estimate the value of surface_friction based at least in part on measurements of wheel slip. In the present embodiment, the amount of slip of a given road wheel is calculated by the ABS controller 150C as the difference between the speed of a given wheel 111, 112, 114, 115 and v_ref.

In some embodiments the value of surface_friction is a substantially constant, fixed value and is not determined in dependence on one or more measured parameters. In some embodiments the value of surface_friction is determined in dependence on the driving mode, with a predetermined value of surface_friction being used when the vehicle is operating in each respective driving mode. For example when the vehicle is operating in a driving mode corresponding to highway driving, the value of surface_friction may be higher than in the case the vehicle is operating in a mode corresponding to driving on grass, gravel or snow. For example in some embodiments a value of substantially 1 may be employed in a highway driving mode whilst a value of 0.5 is employed in a driving mode corresponding to driving on grass, gravel or snow. The value of surface_friction may be the same for one or more driving modes. Other arrangements may also be useful.

In response to receipt of the signal surface_friction, the engine controller 121C is configured to determine the longitudinal force F_long_max that may be applied to a given wheel of the vehicle 100 before the wheel is expected to suffer slip exceeding a prescribed longitudinal slip value S_long, assuming the wheel is not subject to a net lateral force. The engine controller 121C also determines the net lateral force F_lat_max that may be applied to a given wheel of the vehicle 100 before the wheel is expected to suffer slip exceeding a prescribed lateral slip value S_lat, assuming the wheel is not subject to a net longitudinal force. The controller 121C also calculates an instant value of net lateral and longitudinal forces F_lat, F_long on a given wheel at a given moment in time due for example to cornering, the presence of a sideslope, and the application of braking torque and/or powertrain drive torque. In the present embodiment the engine controller 121C determines the net lateral force on a wheel by reference to a lateral acceleration sensor associated with the ABS controller 150C. It is to be understood that yaw acceleration may also be used to calculate the lateral force on each wheel in some embodiments. By yaw acceleration is meant the result of the sum of the moments about the vehicle centre of gravity caused by the forces on each wheel. The sum of the forces on each wheel may be calculated once yaw acceleration and lateral acceleration are known.

The engine controller 121C determines the net longitudinal force on a given wheel by reference to the amount of powertrain drive torque and/or brake torque applied to a wheel at given moment in time. The engine controller 121C determines the powertrain drive torque value by reference to a powertrain torque signal generated by the engine controller 121C, and the amount of brake torque applied by the brakes 151 at a given moment in time by reference to a brake pressure signal generated by the ABS controller 150C. In some embodiments the engine controller 121C may take into account a steerable road wheel angle when calculating the forces F_lat and F_long in respect of steerable road wheels. In some embodiments the steerable road wheel angle may be measured substantially directly at one or more of the steerable road wheels. In addition or instead the steerable road wheel angle may be determined by reference to a signal corresponding to a measurement at one or more predetermined locations in the steering system, e.g. by reference to a steering wheel angle or any other suitable measurement.

It is to be understood that by longitudinal force F_long on a wheel is meant a net force exerted by a wheel on an area of contact (or contact patch) between the wheel and ground, in the plane of the ground, in a direction normal to an axis of rotation of the wheel. By lateral force F_lat on a wheel is meant a net force exerted by a wheel on an area of contact (or contact patch) between the wheel and ground, in the plane of the ground, in a direction normal to the longitudinal force (and parallel to the axis of rotation of the wheel).

Figure 3:
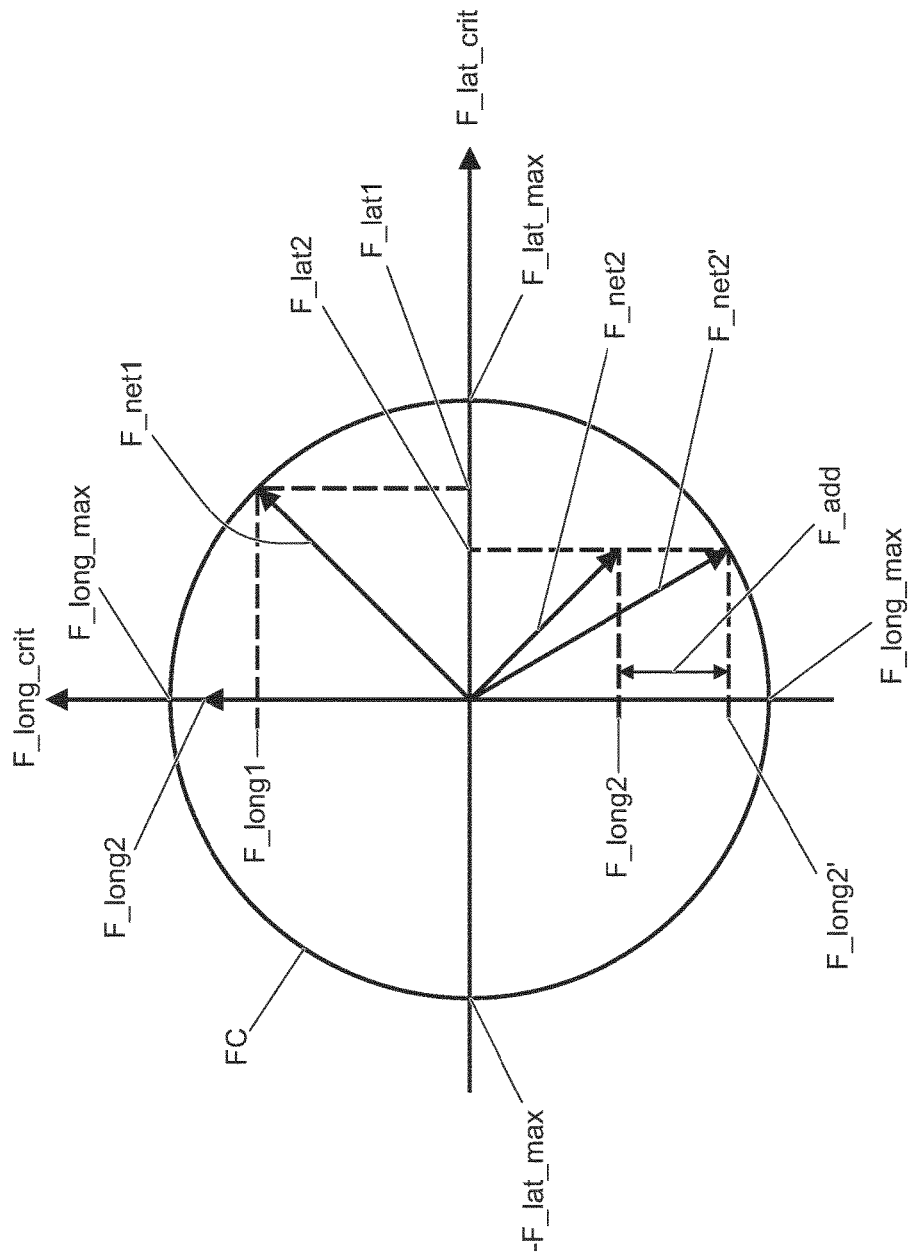
FIG. 3 is a plot of a critical longitudinal force acting on a wheel as a function of a critical lateral force.

By way of illustration, FIG. 3 is a plot of a critical longitudinal force F_long_crit, being a longitudinal force above which longitudinal wheel slip will exceed S_long, as a function of a critical lateral force F_lat_crit, being the lateral force above which lateral wheel slip will exceed S_lat. The plot is commonly referred to as a 'friction circle' FC or 'friction ellipse'. The terms friction circle and friction ellipse will be used synonymously herein, although it is to be understood that whether the plot is substantially or approximately circular or elliptical may depend at least in part on the presence of any directional anisotropy in respect of the surface coefficient of friction between a given wheel and ground. It is to be understood that the shape of the plot may depend on one or more parameters associated with the tire, the driving surface, the normal load on the tire, any camber of the driving surface and/or one or more other parameters, and therefore may deviate substantially from a circular or elliptical profile in some embodiments and/or circumstances.

Assuming that when F_long_crit is zero, F_lat_crit has the same value (F_lat_max) as F_long_crit when F_lat_crit is zero (F_long_max), the friction circle FC is expected to be substantially circular when drawn with orthogonal axes F_lat_crit and F_long_crit that are substantially to the same scale. As noted above, the friction circle may have any other shape in dependence at least in part on one or more of the tire, the driving surface, the normal load on the tire, any camber of the driving surface, and/or one or more other parameters. It can be seen from FIG. 3 that in the present example the friction circle FC intersects orthogonal critical lateral and longitudinal force axes F_lat_crit, F_long_crit at values of critical force of +/−F_lat_max and +/− F_long_max, respectively.

In the present embodiment, the engine controller 121C assumes that the maximum allowable net force on a given wheel at a given moment in time lies on the friction circle FC. Accordingly, after determining the net lateral and longitudinal forces F_lat, F_long on a given wheel, the engine controller 121C is able to determine the resultant (net) force F_net on a given wheel, and in consequence how much additional positive powertrain drive torque would be required in order to cause the net force on a given wheel, F_net, to intersect the friction circle.

By way of example, FIG. 3 shows a net force F_net1 acting on a wheel due to lateral and longitudinal forces F_lat1, F_long1, respectively, acting on the wheel. It can be seen that F_net1 lies on the friction circle FC. In other words, the value of F_lat1 and F_long1 correspond to critical values of F_lat and F_long respectively. Accordingly, any increase in F_lat or F_long will result in lateral or longitudinal wheel slip exceeding S_lat and S_long, respectively.

In contrast, in the case of a net force F_net2 (indicated on the plot FIG. 3) that does not lie on the friction circle, it can be seen that an additional longitudinal component of force F_long substantially equal to F_add may be imposed on the wheel before the resultant net force F_net2' intersects the friction circle FC. As shown in FIG. 3, if an additional longitudinal component of force F_add is added to F_net2, the resultant overall force is F_net2', being the resultant of a lateral force F_lat2 and a longitudinal force F_long2'=F_long2+F_add.

Having determined the value of F_add, the engine controller 121C determines the amount of additional powertrain torque required in order to impose additional force F_add on the wheel.

Figure 5:
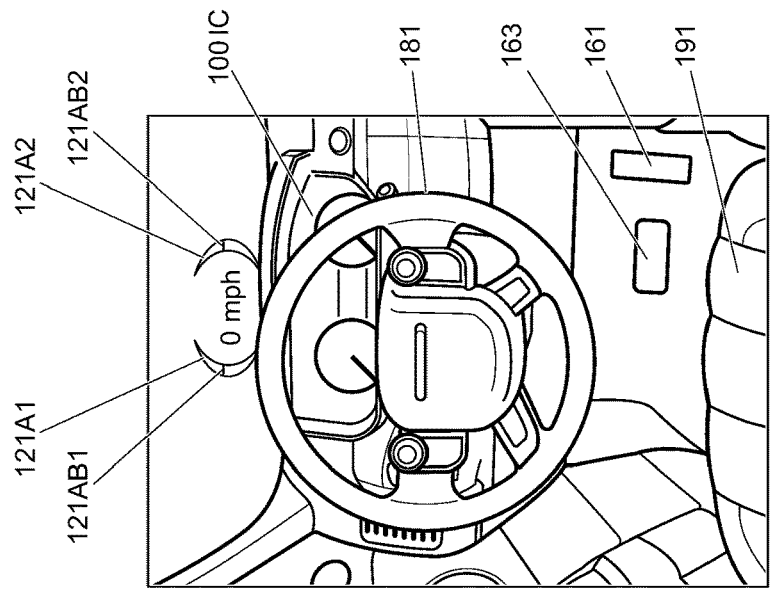
FIG. 5 shows a portion of a cockpit of a vehicle according to an embodiment of the present invention.
Figure 4:
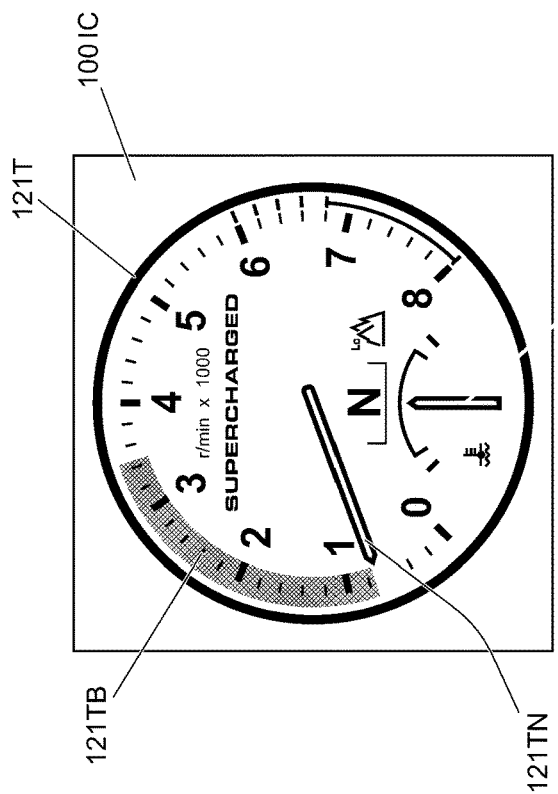
FIG. 4 shows a tachometer of a vehicle according to an embodiment of the invention.

Once the amount of additional powertrain torque required has been calculated, in the present embodiment the engine controller 121C is configured to calculate a value of engine speed speed_crit at which the amount of powertrain torque PT_TQ would be sufficient to deliver this additional amount of powertrain torque. The engine controller 121C then causes a band of allowable engine speeds 121TB to be highlighted on a tachometer 121T displayed on a portion of a display screen that forms part of an instrument cluster panel 100IC of the vehicle 100 as shown in FIG. 4 and FIG. 5. The tachometer 121T has a needle 121TN that rotates to indicate engine speed on corresponding indicia of the tachometer 121T. Provided the driver maintains the needle 121TN within the band 121TB of allowable engine speeds, the amount of powertrain torque will not cause the net force on a given wheel, F_net, to exceed the boundary defined by the friction circle FC. In the present embodiment, the engine controller 121C causes the band of allowable engine speed to be highlighted on the tachometer 121T by outputting to a human machine interface (HMI) controller 100HMI the value of signal speed_crit. The HMI controller 100HMI then highlights on the tachometer 121T the band 121TB of engine speeds from idle speed to speed_crit. Other arrangements are also useful.

It is to be understood that the engine controller 121C is configured repeatedly to determine the value of engine speed at which the amount of powertrain torque PT_TQ would be sufficient to cause F_net to intersect the friction circle. This value may be referred to as a critical powertrain torque limit value, PT_TQ_CRIT. The engine controller 121C repeatedly updates the length of the band 121TB in dependence on the outcome of the engine speed calculation.

It is to be understood that in some embodiments a controller other than the engine controller 121C may be configured to perform one or more calculations associated with the determination of the engine speed at which the amount of powertrain torque PT_TQ would be sufficient to cause F_net to intersect the friction circle, i.e. the engine speed that would result in PT_TQ_CRIT. Two or more controllers may be involved in the calculation. In some embodiments a controller other than the engine controller 121C performs each of the calculations. The engine controller 121C may in some embodiments provide information to one or more other controllers to enable them to perform the one or more calculations. In some embodiments the ABS controller 150C may perform a determination of the amount of powertrain torque PT_TQ that would be sufficient to cause F_net to intersect the friction circle (PT_TQ_CRIT). In vehicles having a stability control system (SCS), a controller associated with the SCS may be configured to perform the determination. In vehicles having one or more control modules configured to control one or more restraint systems such as a seat belt or air bag controller, the a control module associated with or comprised by the restraint system may be configured to perform the determination.

In addition to displaying a band 121 TB of allowable engine speeds on the tachometer 121T, in the present embodiment a graphical display is also provided by means of a head-up display system as shown in FIG. 5. In some embodiments the head-up display system is not included. The head-up display system of the present embodiment is arranged to display a pair of diametrically opposed semicircular display elements 121A1, 121A2, arranged in an upright orientation either side of a driver's centerline of sight directly ahead of the vehicle 100. The elements 121A1, 121A2 are arranged to exhibit mirror symmetry about a substantially vertical mirror plane through the driver's centerline of sight. Superimposed on each of the elements is a substantially horizontal indicator bar or chaplet 121AB1, 121AB2. The bars are arranged to move vertically up and down within the respective semicircular elements 121A1, 121A2 to indicate the range of engine speeds within which F_net will remain within the friction circle. In the embodiment of FIG. 5, the engine controller 121C is configured to cause the indicator bars 121AB1, 121AB2 to reach a vertically upper limit of each of the display elements 121A1, 121A2 when the engine speed reaches a value at which F_net is expected to intersect the friction circle. A vertically lower limit of each of the display elements 121A1, 121A2 corresponds to engine idle speed.

In some embodiments, in addition to or instead of displaying a band of allowable engine speeds, the engine controller 121C may display an indication of the extent to which the accelerator pedal 161 may be depressed before the amount of powertrain torque PT_TQ generated by the engine 121 reaches PT_TQ_CRIT.

For example, in some embodiments the engine controller 121C may display a bar corresponding to a range of allowable stroke of the accelerator pedal 161, extremes of stroke being represented by spatially separate locations along the bar such as extreme ends of the bar, or by indicia superimposed on the bar. A first marker or chaplet such as an arrow or line may be superimposed on the bar indicating a current position of the accelerator pedal with respect to the extremes of stroke. A second marker or chaplet may also be superimposed on the bar, indicating the position of the accelerator pedal 161 at which the net force F_net on a given wheel would intersect the friction circle or ellipse.

Figure 6:
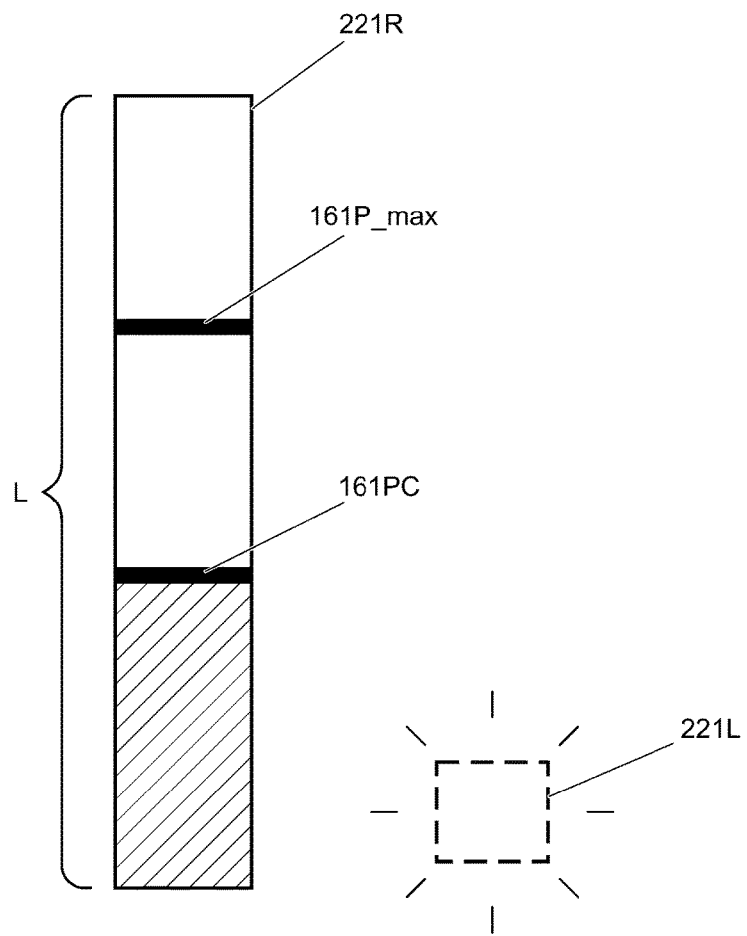
FIG. 6 shows a portion of a display panel of a vehicle according to an embodiment of the present invention.

An example of such a display is shown in FIG. 6. The display is in the form of a bar element 221R of length L. The length L of the bar depicts the range of stroke of the accelerator pedal 161. An accelerator pedal position chaplet 161PC is superimposed on the bar 221R, indicating the instant (current) position of the accelerator pedal 161 with respect to the full range of stroke of the pedal 161. For example, if the accelerator pedal 161 is depressed by an amount corresponding to substantially 50% of its allowable range of stroke, the accelerator pedal position chaplet 161PC assumes a position substantially midway between extreme ends of the bar element 221R. The position of the accelerator pedal position chaplet 161PC in the configuration of FIG. 6 indicates that the accelerator pedal 161 has been depressed approximately 40% of its full range of travel.

The portion of the bar element 221R between the accelerator pedal position chaplet 161PC and the lower end of the bar element 221R (corresponding to a substantially undepressed accelerator pedal 161) is shaded differently from the remainder of the bar element 221R in order to aid visualization by a user of the extent to which the accelerator pedal 161 has been depressed.

A maximum pedal position indicator bar 161P_max is also superimposed on the bar element 221R in order to provide a visual indication to a user of the limit of travel of the accelerator pedal 161 before the net force F_net on a given wheel will intersect the friction circle FC for that wheel. This pedal position may be referred to as a critical accelerator pedal position.

In some embodiments, a further marker may be provided at a position below the maximum pedal position indicator bar 161P_max, indicating a limit of an 'ideal band' or range of accelerator pedal positions. The further marker may for example be provided at a location corresponding to a pedal position 80% of the range of travel of the accelerator pedal 161 from the released position to the position corresponding to the maximum pedal position indicator bar 161P_max.

In some embodiments, in addition to or instead of displaying accelerator pedal stroke, the controller 121C may be configured to display an indication of an amount of powertrain torque demanded by a driver at a given moment in time with respect to an amount of powertrain torque at which the net force F_net on a given wheel would intersect the friction circle or ellipse. In some embodiments the indication of the instant amount of driver demanded torque and the amount of powertrain torque to cause F_net on a wheel to intersect the friction circle may be displayed on a substantially fixed scale representing a range of torque values, optionally a range of achievable powertrain torque values by a vehicle according to a specification of the vehicle. The range of achievable powertrain torque values may be a range of achievable torque values at any predetermined location of a powertrain, for example a location upstream of a transmission or downstream of a transmission, optionally a range of achievable wheel torque values. Other arrangements may also be useful.

In some embodiments, in addition or instead the engine controller 121C may be configured to provide a fixed or flashing visual indication that the accelerator pedal 161 is leaving the 'ideal band' or range of accelerator pedal positions. The visual indication may be provided by means of an indicator lamp, a portion of a digital display panel such as an LCD panel, or any other suitable means. An example of such a lamp is shown in dotted outline at 221L in FIG. 6. In some embodiments, a frequency at which the indicator lamp 221L or portion of the display panel flashes may be varied in dependence at least in part on the proximity of the pedal to the position corresponding to the maximum pedal position indicator bar 161P_max. In some embodiments a visual indication may be provided to a user indicative of a proximity of the pedal to the limit of the ideal band or range to assist a user to maintain the accelerator pedal 161 within the ideal band or range if they so wish. In some embodiments, a display panel may change color in dependence on the accelerator pedal position 161 so as to indicate when the pedal position is about to exceed the critical pedal position.

It is to be understood that, in addition or instead, an audible warning may be provided. In some embodiments haptic feedback may be provided, for example by inducing a vibration in a component such as a seat 191, a steering wheel 181, an accelerator pedal 161 or a brake pedal 163. In addition or instead a change in resistance of a component to movement may be induced, for example a change in resistance of an accelerator pedal 161. In some embodiments a resistance of an accelerator pedal 161 to movement may be induced prior to the accelerator pedal 161 reaching an amount of deflection sufficient to cause the net force F_net on a given wheel to intersect the friction circle or ellipse.

It is to be understood that in some embodiments the engine controller 121C may be configured to calculate values of F_lat_max and F_long_max (enabling the friction circle of FIG. 3 to be defined) and net force F_net in respect of each individual wheel of the vehicle 100. Alternatively the engine controller 121C may calculate an average value of F_lat_max and F_long_max with respect to a plurality of wheels, optionally each driven wheel, and an average value of net force F_net. In some embodiments the engine controller 121C may calculate F_lat_max, F_long_max and F_net in respect of each wheel, and calculate the amount of additional powertrain torque that may be developed before F_net intersects the friction circle in respect of each one of the plurality of wheels. The wheel for which the amount of powertrain torque required to cause the value of F_net to intersect the friction circle is the lowest may be the wheel with respect to which the band of engine speeds 121TB is calculated and displayed, or critical accelerator pedal position determined. This is so that the driver is provided with a warning before any wheel of the vehicle experiences excessive slip. In some embodiments the engine controller 121C may assume that F_lat_max=F_long_max so that only F_long_max or F_lat_max need be calculated in order to determine both F_lat_max and F_long_max.

In some embodiments of the present invention, the engine controller 121C is configured to provide an indication to a user of the magnitude of the prevailing values of F_long_max and F_lat_max (and hence the value of parameter surface_friction).

Figure 7:
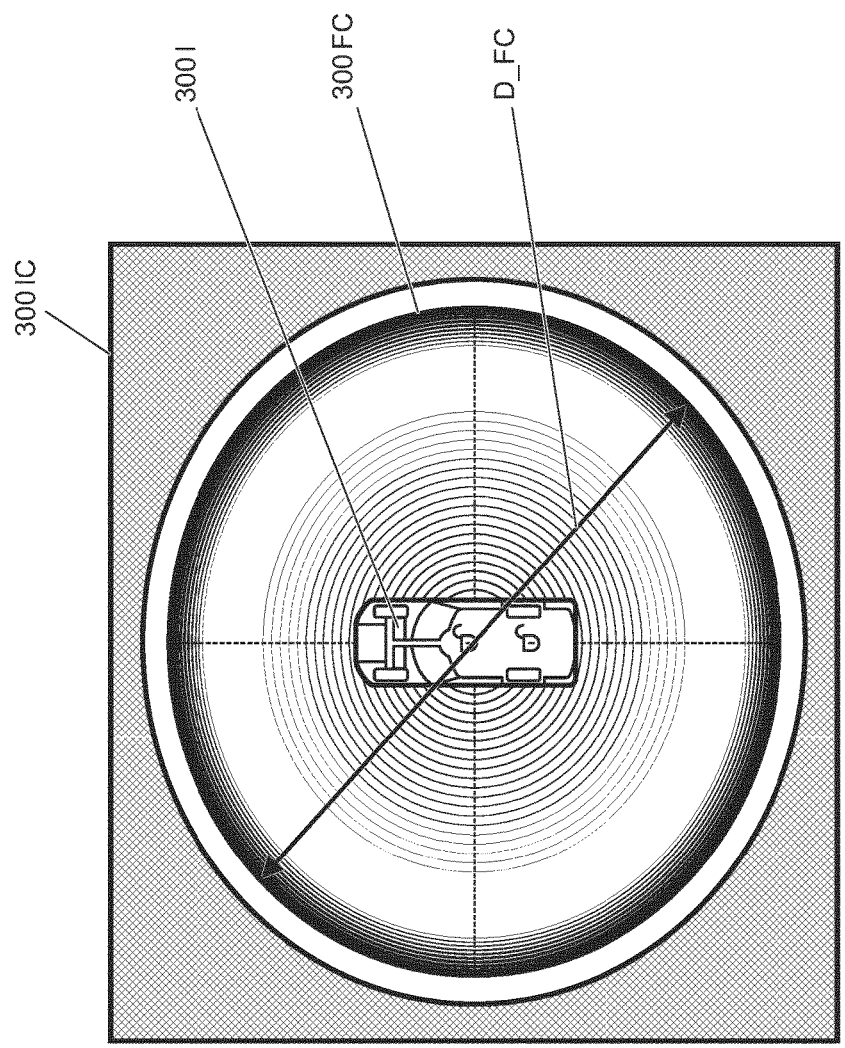
FIG. 7 shows a portion of an instrument display panel according to an embodiment of the present invention.

FIG. 7 shows a screenshot of a portion of an instrument cluster panel 300IC of a vehicle according to an embodiment of the present invention. Like features of the embodiment of FIG. 7 to the embodiment of FIG. 1 are shown with like reference signs prefixed numeral 3 instead of numeral 1.

The engine controller 121C is configured to display a friction circle 300FC on the instrument cluster panel 300IC. The friction circle 300FC has an icon 300I at the centre thereof representative of the vehicle 300. In use, the engine controller 121C repeatedly calculates the value of F_long_max and F_lat_max and scales the diameter D_FC of the friction circle 300FC according to the magnitude of F_long_max and F_lat_max. Accordingly, as the surface coefficient of friction between a wheel and ground increases, the diameter D_FC of the friction circle will tend to increase, whilst as the surface coefficient of friction decreases, the diameter D_FC of the friction circle will tend to decrease.

Figure 8:
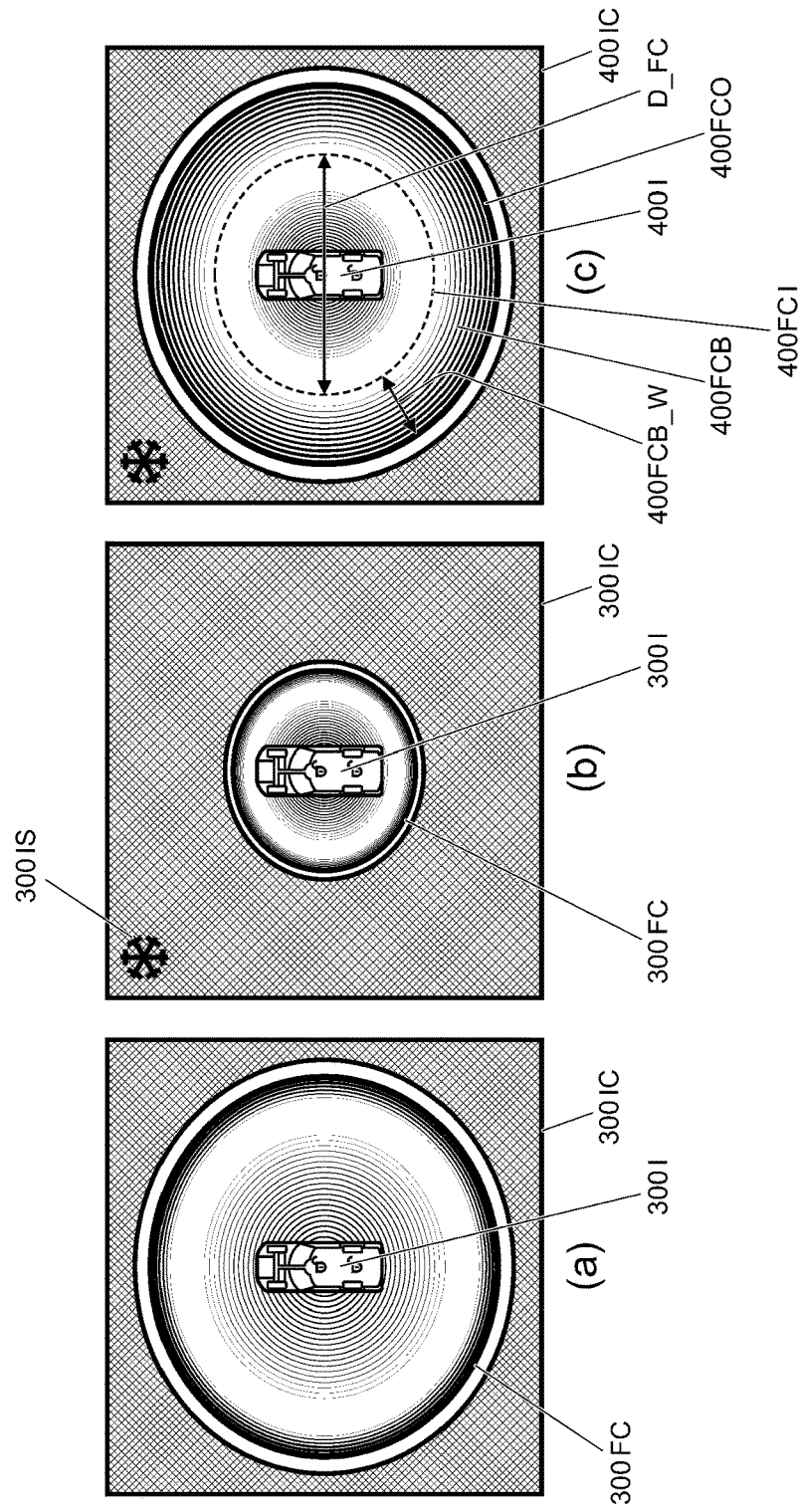
FIG. 8 (a)-(c) shows a portion of an instrument display panel according to an embodiment of the present invention for different values of surface_friction.

FIG. 8(*a*) shows the portion of the instrument cluster panel 300IC when parameter surface_friction is substantially equal to unity, whilst FIG. 8(*b*) shows the same portion of the instrument cluster panel 300IC when surface_friction is substantially equal to 0.4. It can be seen that the diameter of the friction circle 300FC is reduced in FIG. 8(*b*) compared to FIG. 8(a). Furthermore, in the embodiment shown the engine controller 121C is configured to trigger the display of a snowflake icon 3001S when the surface coefficient of friction falls to 0.5 or below, indicating relatively slippery driving conditions.

FIG. 8(c) shows a portion of an instrument cluster panel 400IC in which an outer friction circle 400FCO is displayed superimposed on an image 400I of the vehicle 400 (not shown). The outer friction circle 400FCO has a diameter corresponding to a surface coefficient of friction of substantially 1, and remains of substantially fixed diameter independently of the actual value of surface coefficient of friction surface_friction. However, the engine controller 121C is still configured to calculate a scaled diameter of the friction circle D_FC. Instead of reducing the diameter of the outer friction circle 400FCO in dependence on the value of surface_friction, the controller 121C shades a band 400FCB of the area defined by the outer friction circle 400FCO from the perimeter of the outer friction circle 400FCO to a notional circle 400FCI of diameter D_FC concentric with the outer friction circle 400FCO. The notional circle is shown superimposed on the outer friction circle 400FCO of FIG. 8(c) in dotted outline. As the value of D_FC varies (as the value of surface_friction changes), the engine controller 121C causes a width 400FCB_W of the band 400FCB to vary accordingly. In the scenario depicted in FIG. 8(c) the value of surface_friction is substantially 0.4.

Figure 9:
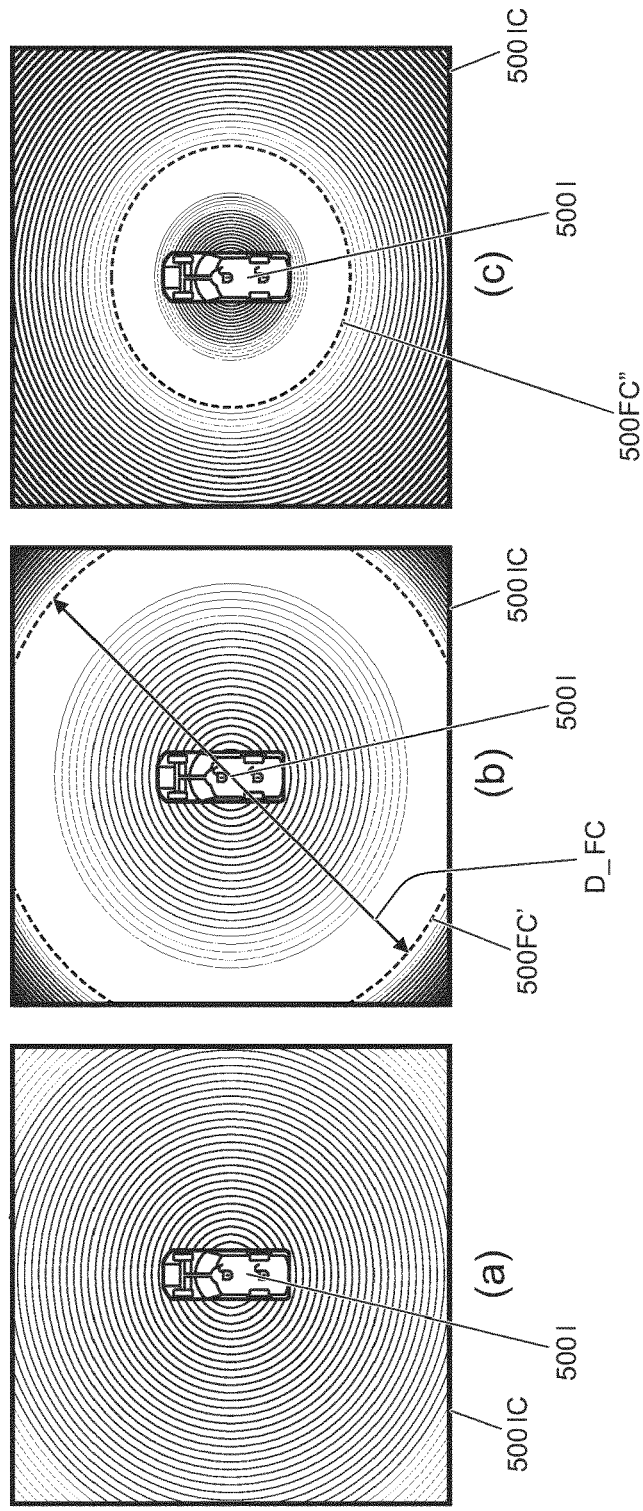
FIG. 9 (a)-(c) shows a portion of an instrument display panel according to a further embodiment of the present invention for different values of surface_friction.

FIG. 9 shows a portion of an instrument cluster panel 500IC according to a further embodiment of the invention. The portion is similar to that of the embodiment of FIG. 8(c), being of substantially square shape. The engine controller 121C is configured to calculate a scaled diameter of a friction circle D_FC for which the diameter when surface_friction is unity is approximately equal to a diameter of the portion of the panel 500IC. The engine controller 121C causes a region of the instrument cluster panel 500IC from the outer edges of the portion of the cluster panel 500IC shown in FIG. 9 to a circle of diameter D_FC centered on vehicle icon 500I to be shaded. As the value of surface_friction decreases the value of D_FC decreases. Accordingly a driver is provided with intuitive visual feedback in respect of the prevailing coefficient of surface friction.

FIG. 9(a) shows the portion of the instrument cluster panel 500IC with parameter surface friction substantially equal to unity whilst FIG. 9(b) shows the same portion of the instrument cluster panel icon 500IC with parameter surface_friction substantially equal to 0.7, It can be seen that a region of the panel 500IC from an outer edge thereof to a notional circle 500FC' (shown in dotted outline) of diameter D_FC centered on the vehicle icon 500I is shaded. FIG. 9(c) is a corresponding image for the case where the parameter surface_friction is substantially equal to 0.4 as shown by notational circle 500FC".

Figure 10:
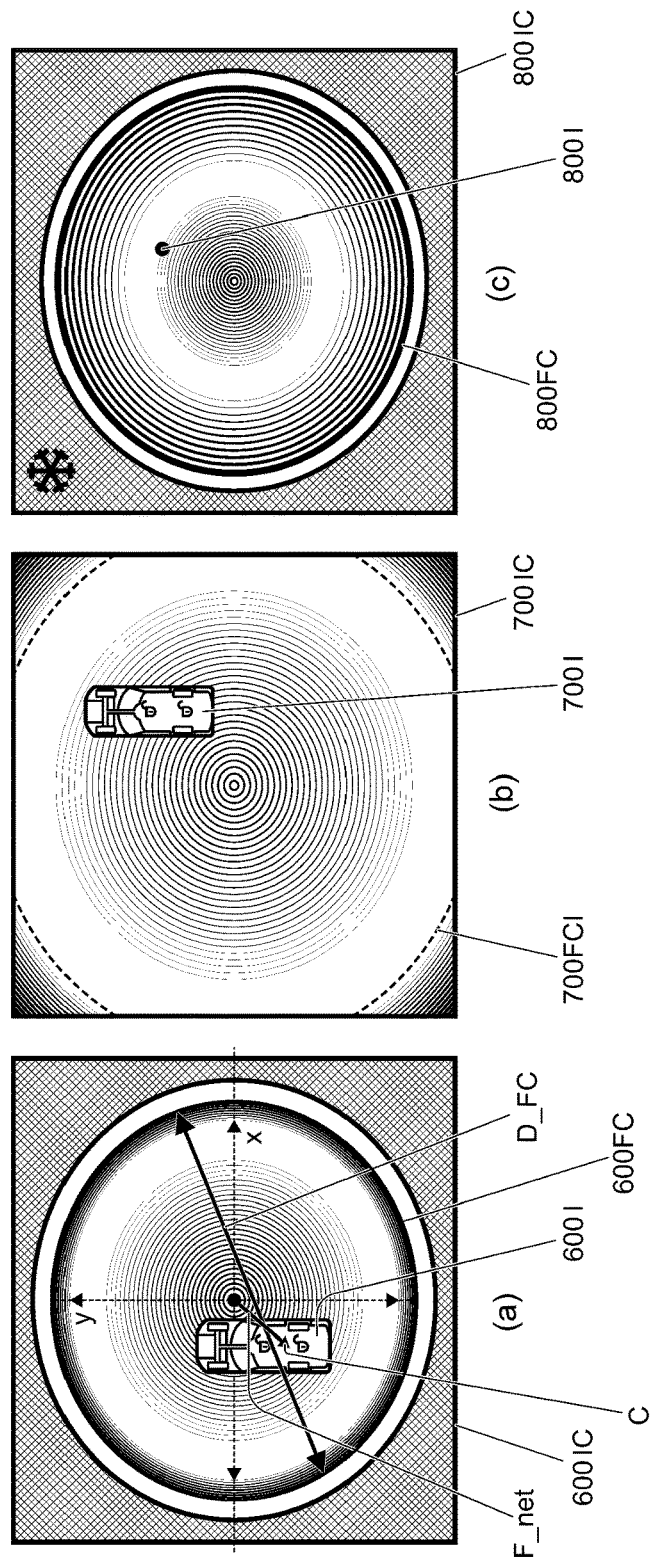
FIG. 10 (a)-(c) shows portions of an instrument display panel according to further embodiments of the present invention.

FIG. 10(a) is a screenshot of an instrument cluster 600IC from an embodiment of the invention similar to that of FIG. 8(a) in which a diameter D_FC of a friction circle 600FC is arranged to vary according to the prevailing value of surface_friction. In addition, a vehicle icon 600I is arranged to move within the friction circle 600FC in dependence on the value of F_lat and F_long at a wheel of the vehicle (not shown) at a given moment in time. The position of a centroid C of the vehicle icon 600I is determined according to the instant values of F_lat and F_long. A distance of the centroid C from a centre of the friction circle 600FC is scaled in proportion to the magnitude of the net force F_net on a wheel relative to F_lat_max and F_long_max. Thus if the magnitude of F_net becomes equal to a radius of the friction circle, the centroid C will intercept circle 600FC of FIG. 10(a). Similarly, a direction of a vector V from the centre of the friction circle to the centroid C is determined according to the relative magnitudes of F_lat and F_long, and corresponds to a direction in which the net force on a wheel acts relative to the vehicle.

In the scenario shown in FIG. 10(a), it can be seen that the net force on a wheel acts towards a direction 225 degrees relative to the vehicle, a straight-ahead direction with respect to the vehicle corresponding to 0/360 degrees. The position of the vehicle icon 600I of FIG. 10(a) indicates that the vehicle is likely turning to the left and decelerating.

FIG. 10(b) is a screenshot from an embodiment of the invention similar to that of FIG. 10(a) except that, as in the case of the embodiment of FIG. 9, a friction circle is defined by a boundary 700FCI between a shaded region and an unshaded region of the portion of the instrument cluster 700IC shown. The vehicle icon 700I moves in a similar manner to that of the embodiment of FIG. 10(a). Thus, in the particular scenario depicted in FIG. 10(b), the position of the vehicle corresponds to the existence of forces on a wheel consistent with a vehicle turning to the right and accelerating as it does so.

FIG. 10(c) is a screenshot of an instrument cluster 800IC showing an embodiment of the invention similar to that of FIG. 10(a). The embodiment of FIG. 10(c) differs in that a circular icon 800I represents the vehicle rather than an icon having the shape of a vehicle. A friction circle 800FC is shown. In some embodiments, an HMI controller may permit different icons to be selected by a user according to their preference. Similarly, in some embodiments an HMI controller may permit different display modes to be selected corresponding to one or more of the embodiments described or illustrated herein.

As noted above, in some embodiments, in addition to or instead of visual feedback, a user may be provided with haptic feedback, for example through vibration of a seat 191, steering wheel 181 or pedal such as the accelerator pedal 161 or brake pedal 163. In some embodiments, the seat 191, steering wheel 181 or accelerator pedal 161 may be configured to vibrate in the event that the accelerator pedal 161 approaches a position at which a net force F_net on a wheel is close to a limit of traction, and above which the amount of lateral or longitudinal slip of a wheel may exceed S_lat or S_long, respectively.

It is to be understood that any one or more of the visual indications described with respect to one or more of FIG. 4 or FIG. 6 to FIG. 10 may be provided in the form or a head-up display.

Some embodiments of the present invention have the feature that a user may be provided with intuitive feedback in respect of forces acting on a wheel. Some embodiments of the invention have the feature that a user may be provided with intuitive feedback in respect of performance limits associated with a vehicle.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A motor vehicle controller comprising:
   an electrical input configured to receive a signal indicative of a surface friction parameter, said surface friction parameter corresponding to a coefficient of friction between a road wheel and a driving surface;
   an electrical input configured to receive a signal indicative of a position of an accelerator control with respect to an allowable range of positions;
   a processor configured to determine, prior to a slip of one or more driving wheels, a critical powertrain torque limit value, indicative of a limit of traction of the road wheel, in dependence at least in part on the signal indicative of a surface friction parameter; and
   an electrical output configured to provide a traction warning indication to a driver in dependence on the signal indicative of the position of the accelerator control and the critical powertrain torque limit value, wherein the traction warning indication is indicative of the position of the accelerator control approaching a position at which an amount of powertrain torque reaches the critical powertrain torque limit value, wherein the traction warning indication is provided before the amount of powertrain torque reaches the critical powertrain torque limit value.

2. The controller according to claim 1 wherein the processor is configured to determine the critical powertrain torque limit value in dependence on an amount of torque required to cause the slip of the one or more driving wheels to exceed a predetermined amount.

3. The controller according to claim 2 configured wherein the predetermined amount of slip is determined by the processor in dependence at least in part on the surface friction parameter.

4. The controller according to claim 3 configured to receive a signal indicative of instant vehicle speed, the controller being configured to determine the predetermined amount of slip in further dependence at least in part on the signal indicative of instant vehicle speed.

5. The controller according to claim 3 configured to receive at least one further parameter indicative of a nature of terrain over which the vehicle is driving, the controller being configured to determine the predetermined amount of slip in further dependence on the at least one further parameter indicative of the nature of terrain over which a vehicle is driving.

6. The controller according to claim 3 configured to receive at least one further parameter indicative of an amount of drag on the vehicle, the controller being configured to determine the predetermined amount of slip in further dependence on the at least one further parameter indicative of the amount of drag on the vehicle.

7. The controller according to claim 3 configured to receive at least one further parameter indicative of a driving mode in which the vehicle is operating, the controller being configured to determine the predetermined amount of slip in further dependence on the at least one further parameter indicative of the driving mode.

8. The controller according to claim 7 wherein the parameter indicative of the driving mode in which the vehicle is operating corresponds to a state of a manual driving mode selector input device or a signal indicative of a driving mode selected automatically by automatic driving mode selection means.

9. A motor vehicle control system comprising a controller, the controller comprising:
   an electrical input configured to receive a signal indicative of a surface friction parameter, said surface friction parameter corresponding to a coefficient of friction between a road wheel and a driving surface;
   an electrical input configured to receive a signal indicative of a position of an accelerator control with respect to an allowable range of positions;
   a processor configured to determine, prior to a slip of one or more driving wheels, a critical powertrain torque limit value in dependence at least in part on the signal indicative of a surface friction parameter; and
   an electrical output configured to provide a traction warning indication to a driver in dependence on the signal indicative of the position of the accelerator control and the critical powertrain torque limit value, wherein the traction warning indication is indicative of the position of the accelerator control approaching a position at which an amount of powertrain torque reaches the critical powertrain torque limit value, wherein the traction warning indication is provided before the amount of powertrain torque reaches the critical powertrain torque limit value.

10. The control system according to claim 9, the controller being configured to receive at least one of: a further parameter indicative of a nature of terrain over which the vehicle is driving, a further parameter indicative of an amount of drag on the vehicle, and a further parameter indicative of a driving mode in which the vehicle is operating, the controller being configured to determine the critical powertrain torque limit value in dependence on an amount of torque required to cause the slip of the one or more driving wheels, the amount of torque dependent on one or more of the further parameters, wherein the driving mode corresponds to a control mode of at least one subsystem of the vehicle, the control system having a subsystem controller for initiating control of the at least one subsystem in a selected one of the plurality of subsystem control modes.

11. The control system according to claim 10 wherein the system comprises a vehicle control unit configured to evaluate one or more driving condition indicators to determine the extent to which each of the subsystem control modes is appropriate.

12. The control system according to claim 10 operable in an automatic operating mode selection condition in which the system is configured automatically to control the subsystem controller to initiate control of the at least one subsystem in the subsystem control mode which is most appropriate.

13. The control system according to claim 10 wherein the driving mode corresponds to one or more control modes selected from the following:
   control modes of at least one vehicle subsystem selected from amongst an engine management system, a transmission system, a steering system, a brakes system and a suspension system;
   control modes of a suspension system, wherein the plurality of subsystem configuration modes comprise a plurality of ride heights;
   control modes of a fluid suspension system in which fluid interconnection can be made between suspensions for wheels on opposite sides of the vehicle, and wherein said plurality of subsystem configuration modes provide different levels of said interconnection;
control modes of a steering system which can provide steering assistance, and wherein said plurality of subsystem configuration modes provide different levels of said steering assistance;
control modes of a brakes system which can provide braking assistance, and said plurality of subsystem configuration modes provide different levels of said braking assistance; control modes of a brake control system which can provide an anti-lock function to control
wheel slip, and said plurality of subsystem configuration modes allow different levels of said wheel slip;
control modes of a powertrain system which includes a powertrain control means and an accelerator or throttle pedal, the subsystem configuration modes providing different levels of responsiveness of the powertrain control means to movement of the accelerator or throttle pedal;
control modes of a traction control system which is arranged to control wheel spin, and said plurality of subsystem configuration modes allow different levels of said wheel spin;
control modes of a yaw control system which is arranged to control vehicle yaw, and said plurality of subsystem configuration modes allow different levels of divergence of said vehicle yaw from an expected yaw;
control modes of a range change transmission and said subsystem configuration modes include a high range mode and a low range mode of said transmission; and
control modes of a transmission system operable in a plurality of transmission ratios and including a transmission controller configured to monitor at least one parameter of the vehicle and to select the transmission ratios in response, and wherein the subsystem configuration modes include a plurality of transmission configuration modes in which the transmission ratios are selected differently in response to said at least one parameter.

14. A motor vehicle comprising a controller, the controller comprising:
an electrical input configured to receive a signal indicative of a surface friction parameter, said surface friction parameter corresponding to a coefficient of friction between a road wheel and a driving surface;
an electrical input configured to receive a signal indicative of a position of an accelerator control with respect to an allowable range of positions;
a processor configured to determine, prior to a slip of one or more driving wheels, a critical powertrain torque limit value in dependence at least in part on the signal indicative of a surface friction parameter; and
an electrical output configured to provide a traction warning indication to a driver in dependence on the signal indicative of the position of the accelerator control and the critical powertrain torque limit value, wherein the traction warning indication is indicative of the position of the accelerator control approaching a position at which an amount of powertrain torque reaches the critical powertrain torque limit value, wherein the traction warning indication is provided before the amount of powertrain torque reaches the critical powertrain torque limit value.

15. The vehicle according to claim 14 comprising a suspension system, a body, a plurality of wheels, a powertrain to drive said wheels, and a braking system to brake said wheels.

16. A method implemented by means of a controller, the method when executed by the controller causes the controller to perform the method steps comprising:
receiving a signal indicative of a surface friction parameter, said surface friction parameter corresponding to a coefficient of friction between a road wheel and a driving surface;
receiving a signal indicative of a position of an accelerator control with respect to an allowable range of positions;
determining, prior to a slip of one or more driving wheels, a critical powertrain torque limit value in dependence at least in part on the signal indicative of a surface friction parameter; and
providing a traction warning indication to a driver in dependence on the signal indicative of the position of the accelerator control and the critical powertrain torque limit value, wherein the traction warning indication is indicative of the position of the accelerator control approaching a position at which an amount of powertrain torque reaches the critical powertrain torque limit value, wherein the traction warning indication is provided before the amount of powertrain torque reaches the critical powertrain torque limit value.

17. The method according to claim 16 comprising determining the critical powertrain torque limit value in dependence on an amount of torque required to cause the slip of the one or more driving wheels to exceed a predetermined amount.

18. The method according to claim 17 comprising determining the predetermined amount of slip in dependence at least in part on the surface friction parameter.

19. The method according to claim 18 comprising receiving a signal indicative of instant vehicle speed, and determining the predetermined amount of slip in further dependence at least in part on the signal indicative of instant vehicle speed.

20. The method according to claim 18 comprising receiving at least one further parameter indicative of a nature of terrain over which a vehicle is driving, the method comprising determining the predetermined amount of slip in further dependence on the at least one further parameter indicative of the nature of terrain over which the vehicle is driving.

21. The method according to claim 20 wherein receiving the at least one further parameter indicative of the nature of terrain comprises receiving a parameter indicative of an amount of drag on the vehicle.

22. The method according to claim 20 wherein receiving the at least one further parameter indicative of the nature of terrain comprises receiving a parameter indicative of a driving mode in which the vehicle is operating.

23. The method according to claim 22 whereby receiving the parameter indicative of the driving mode comprises receiving a signal indicative of a state of a manual driving mode selector input device or a signal indicative of a driving mode selected automatically by automatic driving mode selection means.

24. The method according to claim 22 comprising initiating control of a vehicle subsystem in a selected one of a plurality of subsystem control modes determined in dependence on the parameter indicative of driving mode.

25. A non-transitory carrier medium carrying computer readable code for controlling a vehicle to carry out the method of claim 16.

26. A non-transitory computer readable medium loaded with a computer program product executable on a processor so as to implement the method of claim 16.

27. A motor vehicle comprising a control system, the control system comprising a controller, the controller comprising:
- an electrical input configured to receive a signal indicative of a surface friction parameter, said surface friction parameter corresponding to a coefficient of friction between a road wheel and a driving surface;
- an electrical input configured to receive a signal indicative of a position of an accelerator control with respect to an allowable range of positions;
- a processor configured to determine, prior to a slip of one or more driving wheels, a critical powertrain torque limit value in dependence at least in part on the signal indicative of a surface friction parameter; and
- an electrical output configured to provide a traction warning indication to a driver in dependence on the signal indicative of the position of the accelerator control and the critical powertrain torque limit value, wherein the traction warning indication indicates the position of the accelerator control is approaching a position at which an amount of powertrain torque reaches the critical powertrain torque limit value, wherein the traction warning indication is provided before the amount of powertrain torque reaches the critical powertrain torque limit value.

28. The vehicle according to claim 27 comprising a suspension system, a body, a plurality of wheels, a powertrain to drive said wheels, and a braking system to brake said wheels.

* * * * *